United States Patent [19]

Albouy

[11] Patent Number: 6,117,917
[45] Date of Patent: Sep. 12, 2000

[54] BLOWING AGENT BLENDS AND USE THEREOF

[75] Inventor: Arnaud Albouy, Paris, France

[73] Assignee: Elf Atochem North America, Inc., Philadelphia, Pa.

[21] Appl. No.: 09/290,466

[22] Filed: Apr. 12, 1999

[51] Int. Cl.[7] ............................... C08J 9/14; C08K 5/053
[52] U.S. Cl. ........................... 521/116; 521/117; 521/131
[58] Field of Search ..................................... 521/116, 117, 521/131, 159

[56] References Cited

U.S. PATENT DOCUMENTS

| | | | |
|---|---|---|---|
| 4,972,003 | 11/1990 | Grunbauer et al. | 521/131 |
| 5,278,196 | 1/1994 | Robin et al. | 521/98 |
| 5,300,534 | 4/1994 | Volkert et al. | 521/98 |

FOREIGN PATENT DOCUMENTS

| | | |
|---|---|---|
| 57-40533 | 3/1982 | Japan . |
| WO 91/14732 | 10/1991 | WIPO . |
| WO98/03580 | 1/1998 | WIPO . |

*Primary Examiner*—Robert Dawson
*Assistant Examiner*—D. Aylward

[57] ABSTRACT

B-side compositions comprising a polyol and a gaseous blowing agent comprising 124 dissolved in the polyol are provided, as are processes for producing closed-cell polyurethane or polyisocyanurate polymer foam comprising contacting an isocyanate-containing component with a polyol component in the presence of a blowing agent comprising 124, said blowing agent being dissolved in said polyol component.

4 Claims, No Drawings

BLOWING AGENT BLENDS AND USE THEREOF

BACKGROUND OF THE INVENTION

This invention relates to compositions comprising a blowing agent and a polyol, commonly referred to in the art as B-side compositions or blends, and use of such compositions to produce polyurethane and polyisocyanurate foams ("PUR/PIR foams"). More particularly, the invention relates to such blends, foaming processes and polyisocyanate-based foams which utilize blowing agent compositions comprised of 2-chloro-1,1,1,2-tetrafluoroethane ("HCFC-124" or "124").

Polyisocyanate-based foams are well known in the art in a variety of forms for a variety of purposes, including, for example, as roofing and siding insulation in building construction and as insulation in the manufacture of domestic and industrial refrigerators and freezers. The foams are typically produced by reaction of a polyisocyanate with a polyol, in the presence of a blowing agent. Historically, chlorofluorocarbons such as CFC-11 have been the blowing agents of choice. These materials, however, are being phased out for their possible involvement in affecting the stratospheric ozone and in global warming.

Various alternative blowing agents have been proposed, including gaseous blowing agents such as 142b, 134a and 134, use of the latter, for example, having been disclosed in WO 98/03580. The major drawback of these alternatives is the elevated pressure generated when they are blended with polyols because of their relatively low solubility. What is needed is a gaseous blowing agent which has superior solubility characteristics in polyols and is therefore easier to use than other low boiling blowing agents.

HCFC-124 is disclosed in U.S. Pat. No. 4,972,003 and WO 91/14732 as a blowing agent, but not exemplified. JP 57040533 discloses HCFC-124 as a blowing agent, but only exemplifies its use for co-blowing with CFC-11.

BRIEF SUMMARY OF THE INVENTION

Homogenous B-side compositions for the preparation of polyisocyanate-based polymer foams are provided, which compositions comprise (a) a liquid polyol (such as a polyether or a polyester polyol) and (b) a gaseous blowing agent comprising 124 dissolved in said polyol, as well as processes for producing closed-cell polyurethane or polyisocyanurate polymer foams comprising contacting an isocyanate-containing component with a polyol component in the presence of a blowing agent comprising 124, said blowing agent being dissolved in said polyol component to form a homogenous solution.

One or more conventional co-blowing agents, other than chlorofluorocarbons such as CFC-11, can also be blended with the 124, such as water (for generation of carbon dioxide); other HCFCs such as 1-chloro-1,1-difluoroethane (142b); hydrofluorocarbons such as 1,1,1,2-tetrafluoroethane (134a), 1,1,2,2-tetrafluoroethane (134), 1,1-difluoroethane (152a), 1,1,1-trifluoroethane (143a), difluoromethane (32) and pentafluoroethane (125); and hydrocarbons such as cyclopentane, n-pentane or i-pentane.

DETAILED DESCRIPTION

It has now been found that HCFC-124 is unexpectedly more soluble in conventional liquid polyols than other gaseous hydrochlorofluorocarbons or hydrofluorocarbons, so that at any given pressure (such as at 1 bar) one can incorporate more blowing agent into the polyol component. And, as noted in the aforementioned WO 98/03580, this in turn enables one to obtain a more homogenous polyol/isocyanate reaction mixture, lower density foams, and foams having a more uniform cell structure.

The key parameters for the production of isocyanate-based foams are conventional and are shown, among other places, in the aforementioned WO 98/03580 and in U.S. Pat. No. 5,300,534. The detailed descriptions of these patents are incorporated by reference for their disclosures of the type and ratio of components such as polyisocyanate, polyol, catalyst, surfactant, chain extender and the like.

While any suitable polyol or mixtures thereof can thus be used, examples comprise polyether polyols such as polyethylene oxides, polypropylene oxides, aromatic or aliphatic amine-based polyols, and sorbitol based polyether polyols (such as A3544 available commercially from Arco Chemical) as well as polyester polyols such as those made by transesterifying polyethylene terephthalate scrap with a glycol such as diethylene glycol; an example of a commercially available polyester polyol is Hoechst's Terate 2541.

The 124 blowing agent is preferably incorporated into the B-side with the liquid polyol. Whether used separately or as part of the B-side, the concentration of blowing agent relative to that of the combined weight of the blowing agent and the polyol is typically in the range of about 2–60 weight % (preferably about 5 to 45 weight %), While any suitable polyisocyanate can be used in the foam-making process, examples of suitable polyisocyanates useful for making polyisocyanate-based foam comprise at least one of aromatic, aliphatic and cycloaliphatic polyisocyanates, among others. Representative members of these compounds comprise diisocyanates such as meta- or paraphenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4-diisocyanate, diphenylmethane-2,4-diisocyanate, 4,4-biphenylenediisocyanate and 3,3-dimethyldiphenylpropane-4,4-diisocyanate; triisocyanates such as toluene-2,4,6-triisocyanate and polyisocyanates such as 4,4-dimethyldiphenylmethane-2,2,5,5-tetraisocyanate and the diverse polymethylenepolyphenylpolyisocyanates, mixtures thereof, among others. The isocyanate index (ratio of equivalents of isocyanates to equivalents of the polyol's active hydrogen-containing groups) is advantageously from about 0.9 to about 10, in most cases from about 1.0 to about 4.0.

It is often desirable to employ minor amounts of certain other ingredients in preparing polyisocyanate-based foams. Among these other ingredients comprise one or more members from the group consisting of catalysts, surfactants, flame retardants, preservatives, colorants, antioxidants, reinforcing agents, filler, antistatic agents, among others well known in this art.

Depending upon the composition, a surfactant can be employed to stabilize the foaming reaction mixture while curing. Such surfactants may comprise a liquid or solid organosilicone compound. The surfactants are employed in amounts sufficient to stabilize the foaming reaction mixture against collapse and to prevent the formation of large, uneven cells. About 0.2 to about 5 parts or more of the surfactant per 100 parts by weight polyol are usually sufficient.

One or more catalysts for the reaction of the polyol with the polyisocyanate may also be employed. While any suitable urethane catalyst may be employed, specific catalysts comprise tertiary amine compounds and organometallic compounds. Exemplary such catalysts are disclosed, for example, in U.S. Pat. No. 5,164,419, which disclosure is incorporated herein by reference. For example, a catalyst for the trimerization of polyisocyanates, such as an alkali metal alkoxide, alkali metal carboxylate, or quaternary amine compound, may also optionally be employed. Such catalysts are used in an amount which measurably increases the rate of reaction of the polyisocyanate. Typical amounts are about 0.1 to about 5 parts of catalyst per 100 parts by weight of polyol.

In the process of making the foam, the B-side blend, polyisocyanate and other components are contacted, thoroughly mixed, and permitted to expand and cure into a cellular polymer foam. The mixing apparatus is not critical.

The invention composition and processes are applicable to the production of all kinds of expanded polyurethane foams, including, for example, integral skin, RIM and flexible foams, and in particular rigid closed-cell polymer foams useful in spray insulation as foam-in-place appliance foams, or rigid insulating board stock and in laminates.

EXAMPLES

The following examples are given to illustrate the invention and should not be interpreted as limiting in any way. Unless stated otherwise, all parts and percentages are given by weight.

Examples 1 and 2 illustrate solubility of 124 in comparison to several of the known blowing agents (142b, 134 and 134a) and have been conducted according to the following procedure: (a) a known mass of liquid polyol is introduced inside an aerosol can; (b) after sealing the can, a known mass of blowing agent is added; (c) the aerosol can is vigorously stirred for 30 minutes; (d) the partial pressure of the blowing agent is measured once the can has been conditioned at 25° C.; (e) the aerosol can is then partially decompressed and the weight loss is recorded; (f) after a new manual stirring, followed by a conditioning at 25° C., the pressure inside the can is noted; (g) knowing the free volume inside the can, the initial air partial pressure, the weight loss after the decompression, this last pressure determination enables one to calculate the residual equilibrium partial pressure of the gaseous blowing agent. By applying this procedure, the amount of blowing agent solubilized is then determined as a function of its partial pressure.

Table I gives the saturated vapor pressure at 25° C. of the blowing agents studied hereafter:

TABLE I

| Blowing Agent | Boiling Point (° C.) | Psat (bar) @ 25° C. |
| --- | --- | --- |
| 124 | −12.1 | 3.8 |
| 142b | −9.6 | 3.4 |
| 134a | −26.4 | 6.6 |
| 134 | −20.7 | 5.2 |

Example 1

Solubility in A3544 Polyether Polyol

Table II represents the results of solubility tests in the subject sorbitol-based polyol. In this table, there are 2 lines of data for each of the 4 blowing agents tested, the top line indicating mole of blowing agent dissolved per 100 g of polyol and the bottom line indicating the partial pressure of that amount of blowing agent. Because several more readings were taken for 124 than for the other blowing agents, only representative readings are shown in the tables (the omitted readings do not materially differ from the data given):

TABLE II

| Blowing Agent | Mole Dissolved and Partial Pressure | | | | | | |
| --- | --- | --- | --- | --- | --- | --- | --- |
| 124 | .016 | .038 | .064 | .084 | .114 | .147 | .226 |
|  | 0.13 | 0.19 | 0.46 | 0.60 | 0.99 | 1.35 | 1.79 |
| 142b | .019 | .037 | .059 | .074 | | | |
|  | 0.38 | 0.55 | 0.81 | 1.03 | | | |
| 134 | .038 | .057 | .073 | .088 | | | |
|  | 0.43 | 0.61 | 0.85 | 1.05 | | | |
| 134a | .023 | .044 | .053 | .070 | | | |
|  | 0.85 | 1.22 | 1.43 | 1.91 | | | |

These determinations show clearly the unexpected good solubility of 124 in the polyether polyol studied. Thus, at any given pressure, it is possible to incorporate more 124 into the polyol than any of the other blowing agents.

Example 2

Solubility in T2541 Polyester Polyol

Table III represents the results of solubility tests in the subject polyester polyol:

TABLE III

| Blowing Agent | Mole Dissolved and Partial Pressure | | | | | | |
| --- | --- | --- | --- | --- | --- | --- | --- |
| 124 | .011 | .019 | .032 | .040 | .048 | .052 | .064 | .079 |
|  | 0.42 | 0.54 | 0.55 | 0.69 | 0.95 | 1.07 | 1.28 | 1.38 |
| 142b | .022 | .031 | .040 | .064 | | | |
|  | 0.74 | 0.80 | 0.90 | 1.84 | | | |
| 134 | .021 | .039 | .054 | .063 | | | |
|  | 0.41 | 0.80 | 1.28 | 1.17 | | | |
| 134a | .008 | .014 | .020 | .027 | | | |
|  | 0.85 | 1.05 | 1.26 | 1.62 | | | |

These results again show the unexpected good solubility of 124. In particular, for a blowing agent partial pressure of 1 bar, 124 is the blowing agent, among those tested, which permits incorporation of the greatest number of mole in the polyol.

Example 3

Foaming Tests

The following mixture was prepared:

100 parts of a polyol system (Arco Chemical's A2055 which includes polyether polyol, water, catalyst and surfactant), to which was added, in a pressurized container, 20 parts of 124.

This mixture was then reacted at 18° C. with 129.5 parts of Suprasec DNR, a polymeric methylene diisocyanate available from ICI, resulting in a rigid polyurethane foam with the characteristics shown in Table IV:

TABLE IV

| | |
|---|---|
| Cream Time: | 15 seconds |
| Gel Time: | 190 seconds |
| Tack-free time: | >300 seconds |
| Core density: | 28 g/l |
| Compression set (kPa) | |
| Parallel maxi | 103 @ 6% |
| Perpendicular maxi | 102 @ 10% |

What is claimed is:

1. A homogenous B-side composition for the preparation of polyisocyanate-based polymer foams comprising (a) a liquid polyol and (b) a gaseous blowing agent comprising 2-chloro-1,1,1,2-tetrafluoroethane dissolved in said polyol.

2. A composition as in claim 1 wherein the blowing agent also comprises at least one co-blowing agent selected from water, hydrocarbons, hydrofluorocarbons and other hydrochlorofluorocarbons.

3. A process for producing a closed-cell polyurethane or polyisocyanurate polymer foam comprising contacting an isocyanate-containing component with a polyol component in the presence of a blowing agent comprising 2-chloro-1,1,1,2-tetrafluoroethane, wherein said blowing agent is dissolved in said polyol component to form a homogenous solution.

4. A process for preparing a homogenous B-side composition for the preparation of polyisocyanate-based polymer foams, which process comprises dissolving 2-chloro-1,1,1,2-tetrafluoroethane into a liquid polyol.

* * * * *